(12) United States Patent
Wong et al.

(10) Patent No.: US 11,323,588 B2
(45) Date of Patent: May 3, 2022

(54) PRINT MATERIAL SUBSCRIPTION PLANS

(71) Applicant: HEWLETT-PACKARD DEVELOPMENT COMPANY, L.P., Spring, TX (US)

(72) Inventors: Simon Wong, Singapore (SG); Bee Ling Peh, Singapore (SG); David B Novak, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/500,381

(22) PCT Filed: Jun. 29, 2018

(86) PCT No.: PCT/US2018/040372
§ 371 (c)(1),
(2) Date: Oct. 2, 2019

(87) PCT Pub. No.: WO2020/005283
PCT Pub. Date: Jan. 2, 2020

(65) Prior Publication Data
US 2021/0368063 A1 Nov. 25, 2021

(51) Int. Cl.
*H04N 1/34* (2006.01)
*G03G 15/00* (2006.01)
*G06F 3/12* (2006.01)

(52) U.S. Cl.
CPC ........... *H04N 1/344* (2013.01); *G03G 15/556* (2013.01); *G06F 3/1204* (2013.01); *G06F 3/1239* (2013.01)

(58) Field of Classification Search
None
See application file for complete search history.

(56) References Cited

U.S. PATENT DOCUMENTS

| | | | |
|---|---|---|---|
| 5,349,377 A | 9/1994 | Gilliland et al. |
| 8,732,038 B2 | 5/2014 | Nagata |
| 8,734,034 B2 | 5/2014 | Morovic et al. |
| 9,134,675 B2 | 9/2015 | Yang et al. |
| 9,217,954 B2 | 12/2015 | Mo |
| 9,524,132 B2 | 12/2016 | Weaver et al. |
| 9,836,253 B2 | 12/2017 | Tomono |
| 9,954,739 B2 | 4/2018 | Khanna |
| 2002/0163662 A1 | 11/2002 | Kaufman et al. |
| 2003/0020951 A1 | 1/2003 | Minowa et al. |
| 2009/0089192 A1 | 4/2009 | Ferlitsch |
| 2010/0293268 A1 | 11/2010 | Jones et al. |
| 2018/0054530 A1 | 2/2018 | Osadchyy |
| 2018/0131831 A1 | 5/2018 | Tolia et al. |

FOREIGN PATENT DOCUMENTS

CN 104260565 A 1/2015
WO WO2014120187 A1 8/2014

*Primary Examiner* — Lennin R Rodriguezgonzalez
(74) *Attorney, Agent, or Firm* — Brooks Cameron & Huebsch PLLC

(57) ABSTRACT

Examples techniques to determine print material subscription plans for image rendering devices are described. In an example, data indicative of print material consumption by an image rendering device for a period of time is received at a server. Based on the received data, a print material subscription plan is determined for the image rendering device. Signals to enable provision of a notification corresponding to first print material subscription plan are transmitted to the image rendering device.

14 Claims, 7 Drawing Sheets

PRINT MATERIAL SUBSCRIPTION PLANS

BACKGROUND

Image rendering devices, such as printers, scanners, and photocopiers print content on media. Printing involves deposition of print material on a medium to form markings on the medium. During a print operation, print material stored in a reservoir of an image rendering device is fetched and is dispersed onto the medium. Thus, the print material in the reservoir is continuously consumed during print operations and when a level of the print material in the reservoir reaches a threshold, the user has to replenish the reservoir to continue with further print operations.

Some image rendering devices may use removable cartridges which contain print material for printing. When the print material in a cartridge reaches a threshold, the cartridge is replaced with a new cartridge.

BRIEF DESCRIPTION OF FIGURES

The following detailed description references the drawings, wherein.

DETAILED DESCRIPTION

Figure 1:
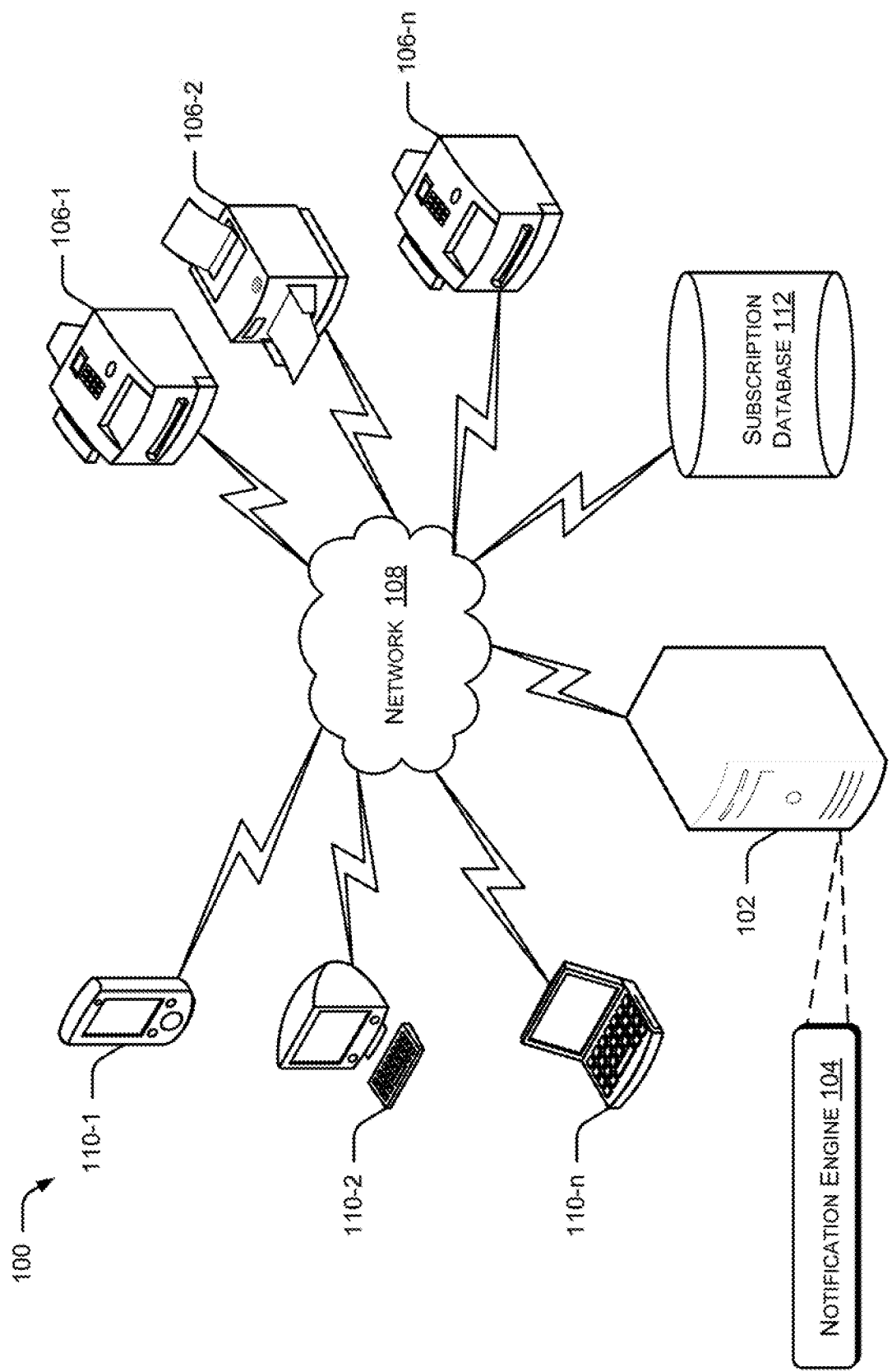
FIG. 1 illustrates a print environment implementing a subscription management server, in accordance with an example implementation of the present subject matter.

Image rendering devices, such as plotters, printers, and photocopiers use print material for printing content on a medium. The usage of print material depletes print material stored in a reservoir or cartridge of the image rendering device. The rate of consumption of the print material depends on various factors, such as type of content printed or a number of media printed by the image rendering device. For example, if an image rendering device prints high-density content, such as photographic images, graphical diagrams, as opposed to text-based content, the rate of print material consumption is high. When a level of the print material in the reservoir or the cartridge depletes up to a threshold, a low-on-print material message may be generated by the image rendering device. Based on such a message, a user of the image rendering device may procure print material to refill the reservoir or may purchase a new cartridge to replace the existing cartridge with the new cartridge.

In some cases, a user may subscribe to a print material procurement plan in which the print material is provided by a service provider. Generally, the service provider may provide a plurality of print material procurement plans, hereinafter interchangeably referred to as plan(s), where each plan provides a predetermined amount of print material over a period of time and has an associated cost which may be referred to as subscription fees. To subscribe to a plan from amongst the several available plans, the user may select a plan, for example, based on his estimation of the rate of consumption of the print material by the image rendering device. Given that the rate of consumption of the print material is based on several factors as mentioned above, it is likely that the user may inaccurately estimate the consumption and may consequently select a plan that may not be suitable for the image rendering device.

In some cases, the service provider may provide print material procurement plans based on numbers of media to be printed. For example, the service provider may provide a plan which allows users to print 'n' media monthly, wherein the print material for the printing is provided by the service provider. However, the type of content printed on the medium may vary from user to user. For example, a first user having subscribed for the above plan may print 'n' media with photographic images while a second user with the same plan may print 'n' media with textual content. Thus, the cost incurred by the service provider from the subscription of the first user may be higher compared to that of the second user. However, as the service provider is unaware of the consumption of print material by the users, it may result in high cost to the service provider. At the same time, a user, such as the second user in the above example, may also incur higher cost compare to the cost he would incur had the plan been in accordance with his print material consumption.

Thus, the determination of a plan for an image rendering device is based on an estimation of the rate of consumption of the print material. Data relating to the rate of consumption of print material by the image rendering device, such as the average time between two consecutive low-on-print material message generated by the image rendering device, type of content printed by the image rendering device or a number of media printed by the image rendering device in a given period of time in the past is unavailable for a determination of print material consumption and in turn an informed decision on the plan is to be made. In absence of such data, it is likely that the user or the service provider may inaccurately estimate the print material consumption and may consequently select or offer, respectively, a plan that may not be suitable for the image rendering device. The unsuitable plan may result in the user or the service provider incurring additional cost and may also affect timeliness of procurement of the print material.

According to examples of the present subject matter, techniques for determining a print material subscription plan for an image rendering device based on a determination of the print material consumption by the image rendering device is described. According to the present subject matter, data indicative of print material consumption by an image rendering device for a period of time is received at a server. In an example, the data indicative of print material consumption by the image rendering device comprises a number of media printed by the image rendering device, a mode of printing of the image rendering device or a type of content printed by the image rendering device. Based on the received data, a print material subscription plan, for example, from amongst a plurality of the print material subscription plan, is determined. The server generates signals which enable provisioning of a notification corresponding to the determined print material subscription plan.

Thus, in accordance with the example, techniques for determining a plan is described herein, the determination of a plan for the image rendering device is based on monitoring of the data relating to rate of consumption of print material by the image rendering device for a period of time. The monitoring is automatic and does not impose a burden of manual tracking of the print material consumption by the image rendering device on a user. The notification provides for selection of a plan for the image rendering device that is optimal for the user and the service provider and may avoid either party from incurring additional cost due to selection of a sub-optimal subscription plan.

The above techniques are further described with reference to FIG. 1 to FIG. 7. It should be noted that the description and the Figures merely illustrate the principles of the present subject matter along with examples described herein and should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 shows a print environment 100 implementing a subscription management (SM) server 102, according to an example implementation of the present subject matter. In an example, the SM server 102, interchangeably referred to as the server 102, comprises a notification engine 104 to generate signals to enable provision of a notification indicative of a print material subscription plan corresponding to each of image rendering devices 106-1, 106-2, . . . , 106-n coupled to the server 102 in the print environment 100, for example, through a network 108.

The network 108 may be a single network or a combination of multiple networks and may use a variety of different communication protocols. The network 108 may be a wireless or a wired network, or a combination thereof. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NON), Public Switched Telephone Network (PSTN). Depending on the technology, the communication network 108 includes various network entities, such as gateways, routers; however, such details have been omitted for the sake of brevity of the present description.

The server 102 may be implemented as a computing device, including, for example, a desktop, a personal computer, a notebook or portable computer, a workstation, a mainframe computer, and a laptop. Further, in one example, the server 102 may be a distributed or centralized network system in which different computing devices may host the hardware or software components of the server 102.

Examples of the image rendering device 106-1, 106-2, . . . , 106-n include printers, plotter, scanners, photocopier and any other electronic devices that may execute print commands to print content on a medium by consuming a print material. Further, examples of the image rendering device 106-1, 106-2, . . . , 106-n also include 3D printers that may print three dimensional objects based on an additive manufacturing process.

In the print environment 100, each of the image rendering devices 106-1, 106-2, . . . , 106-n may be accessed by multiple users through their respective user devices 110-1, 110-2, . . . , 110-n. Examples of the user devices 110-1, 110-2, . . . , 110-n include, but are not limited to, electronic device, such as a desktop computer, a laptop, a smartphone, a personal digital assistant (PDAs), and a tablet that may allow a user to a provide a print command to the image rendering devices 106-1, 106-2, . . . , 106-n. In an example, the user devices 110-1, 110-2, . . . , 110-n may communicate with the image rendering devices 106-1, 106-2, . . . , 106-n over the network 108 to provide the print command to the image rendering devices 106-1, 106-2, . . . , 106-n.

In an example, the image rendering device 106-1 may preform print operations based on the print commands received from user devices 110-1, 110-2, . . . , 110-n. The image rendering device 106-1 may preform several print operations, each for printing a different number of media with various types of content, over a period of time. With each print operation, print material in a reservoir of the image rendering device 106-1 is consumed. The print material may be understood as a printing ink, a colorant or any other material, such as a consumable material extruded by a 3D printer in layers to create an object. In an example, the print material may be a fluid, a solid or may be in a powdered form.

In accordance with an example implementation of the present subject matter, the image rendering device 106-1 may provide data indicative of the print material consumption for a period of time to the server 102. In an example, the data indicative of print material consumption by an image rendering device 106-1 may comprise a number of media printed by the image rendering device. For example, the server 102 may receive the data regarding a number of standard sheets of paper printed by the image rendering device 106-1 and may accordingly compute the print material consumption based on an average amount of print material consumed in printing a standard sheet.

In an example, the data indicative of print material consumption by an image rendering device 106-1 may comprise a mode of printing of the image rendering device 106-1. For instance, the image rendering device 106-1 may indicate to the server 102 that the image rendering device 106-1 is operating in a high-resolution printing mode. The server 102 may use this data in conjunction with data relating to the number of media printed by the image rendering device 106-1 to derive the print material consumption by the image rendering device 106-1. For example, the image rendering device 106-1 may use a known volume of print material consumed in printing a standard page in high resolution mode to compute the print material consumption.

Example of the data indicative of print material consumption by an image rendering device 106-1 may also include a type of content printed by the image rendering device 106-1. As previously explained, the amount of print material consumed also depends on the type of content printed by the image rendering device 106-1. Accordingly, in an example, the image rendering device 106-1 may indicate to the server 102, the type of the content, such as a high-density or low-density content printed by the image rendering device 106-1. In an example, the image rendering device 106-1 may estimate a number of droplets of print material ejected by nozzles of the image rendering device 106-1 per-media or per-print-job and may indicate the estimated number to the server 102. The number of droplets ejected by the nozzles indicate the amount of the print material consumed by the image rendering device 106-1 for the printing process. The server 102 may analyze the type of content printed or the estimated number of droplets being ejected to derive the amount of print material consumed by the image rendering device 106-1.

In an example, receiving the data indicative of print material consumption by the image rendering device 106-1 comprises receiving a low-on-print material message. The low-on-print material message may be sent by an image rendering device 106-1, such as the image rendering device 106-1 to the server 102 when the print material in the reservoir or the cartridge of the image rendering device 106-1 reaches a predefined level. The server 102 may receive a plurality of low-on-print material message from the image rendering device 106-1 over a period of time and may determine an average time between two consecutive low-on-print material message generated by the image rendering device 106-1. The server 102 may compute the rate of consumption of the print material by the image rendering device 106-1 based on the average time between two consecutive low-on-print material messages. For example, server 102 may be aware of a volume of the reservoir of the image rendering device 106-1 and may use the same along with the frequency of low-on-print material messages to determine the amount of print material consumed by the image rendering device 106-1.

In an example implementation, the server 102 may receive the data indicative of print material consumption from each of the image rendering devices 106-1, 106-2, . . . , 106-n for a period of time. For example, the data may be collated by an image rendering device 106-1, such the image rendering device 106-1, for a period of time, such as a week, month etc., and the same may be transmitted to the server 102 at the end of said period of time. In such cases, the image rendering device 106-1 may locally store the data collected over the period of time and may transmit it periodically at the end of the period of time. In another example implementation, the image rendering device 106-1 may transmit the data indicative of print material consumption to the server 102 on a per-print-job basis. For example, the image rendering device 106-1 may transmit the data indicative of print material consumption, such as the number of media printed, and types of content printed to the server 102 at the end of a print job. The server 102 may store the data received from each of the image rendering devices 106-1, 106-2, . . . , 106-n and collate the data received over the period of time.

Based on the data received over the period of time, the server 102 may determine, for each of the image rendering devices 106-1, 106-2, . . . , 106-n, a print material subscription plan. Further, the notification engine 104 of the server 102 transmits signals to each of the image rendering devices 106-1, 106-2, . . . , 106-n. The signals are to enable the provision of a notification which is indicative of the determined print material subscription plan corresponding to each of the image rendering devices 106-1, 106-2, . . . , 106-n. The 'print material subscription plan' may be referred to as 'plan' hereinafter.

In an example, the server 102 may retrieve a contact information corresponding to users of the image rendering devices 106-1, 106-2, . . . , 106-n, from a subscription database 112 and may thereafter transmit the signals to the contact information. For example, the server 102 may retrieve an email or a mobile number associated with a user of the image rendering device 106-1 and may transmit the signals to associated email or the mobile number.

Figure 2:
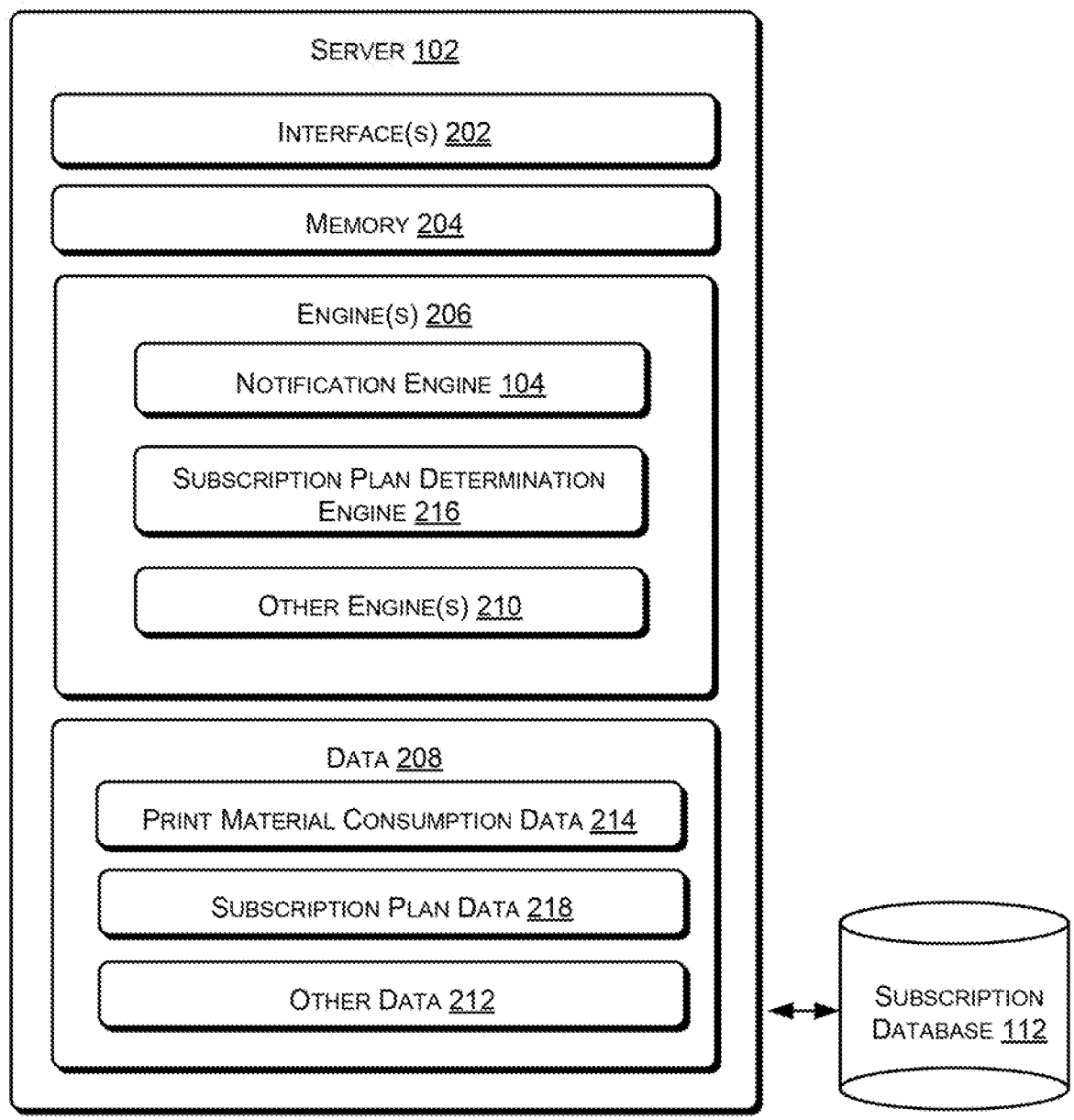
FIG. 2 illustrates a subscription management server, in accordance with an example implementation of the present subject matter.

FIG. 2 illustrates the SM server 102, in accordance with an example implementation of the present subject matter.

The server 102, among other things, includes interface(s) 202, a memory 204, and engine(s) 206. The memory 204 may include any computer-readable medium including, for example, volatile memory (e.g., RAM), and/or non-volatile memory (e.g., EPROM, flash memory, etc.). The interface(s) 202 may include a variety of software and hardware interfaces that allow the server 102 to connect to the network 108 and to send and receive data from the image rendering devices 106-1, 106-2, . . . , 106-n.

The engine(s) 206 may be implemented as a combination of hardware and programming (for example, programmable instructions) to implement certain functionalities of the engine(s) 206, such as transmitting signals. In examples described herein, such combinations of hardware and programming may be implemented in several different ways. For example, the programming for the engine(s) 206 may be the processor executable instructions stored on a non-transitory machine-readable storage medium and the hardware for the engine(s) 206 may include a processing resource (for example, Implemented as either a single processor or a combination of multiple processors), to execute such instructions. In the present examples, the machine-readable storage medium may store instructions that, when executed by the processing resource, implement engine(s) 206. In such examples, the server 102 may include the machine-readable storage medium storing the instructions and the processing resource to execute the instructions, or the machine-readable storage medium may be separate but accessible to server 102 and the processing resource. In other examples, engine(s) 206 may be implemented by electronic circuitry. In an example, in addition to the aforementioned notification engine 104, the engine(s) 206 may also comprise other engine(s) 210 that supplement functions of the server 102.

The data 208 serves, amongst other things, as a repository for storing data that may be fetched, processed, received, or generated by the engine(s) 206 or any data received by the server 102, such as the data indicative of print material consumption by the image rendering devices 106-1, 106-2, . . . , 106-n received by the server 102. The data 208 comprises other data 212 corresponding to the other engine(s) 210. In the illustrated example implementation, the data 208 of the image rendering device 106-1 comprises print material consumption data 214 and a subscription plan data 218. The other data 212 may store the data pertaining to the other engine(s) 210.

As explained above, the server 102 may receive data indicative of the print material consumption by the image rendering devices 106-1, 106-2, . . . 106-n. In an example, the data may include a number of media printed by the image rendering devices 106-1, 106-2, . . . 106-n, a mode of printing of the image rendering devices 106-1, 106-2, . . . 106-n, a low-on-print material message, and other data as explained previously with reference to FIG. 1. The server 102 may store the received data in the print material consumption data 214.

In an example implementation, when a user initially installs an image rendering device, such as the image rendering device 106-1, for the first time, the user may be prompted to register the image rendering device 106-1 with the server 102. The image rendering device 106-1 can, thereafter, communicate with the server 102 to transmit the data to the server 102. For example, considering that the image rendering device 106-1 is registered with the server 102, during the operation of the image rendering device 106-1, the image rendering device 106-1 may transmit the data indicative of its print material consumption to the server 102. As explained earlier, the image rendering device 106-1 may transmit the data over a period of time either periodically, or on a per-print-job or per-media basis.

The server 102 may determine, based on the received data, a plan for the image rendering device 106-1. In an example, the engine(s) may comprise a subscription plan determination engine 216 which may determine the plan for the image rendering device 106-1 using the subscription plan data 218 residing in the data 208 of the server 102. The subscription plan data 218 may comprise a list of various available plans wherein each of the plan may provide for an amount of print material or a number of media or both for a subscription fee. In an example, the list of plans in the subscription plan data 218 may be stored and updated time-to-time by the service provider. The subscription plan determination engine 216 may compare the print material consumption of the image rendering device 106-1 with an amount of print material defined for each of the plans in the list of plans available in the subscription plan data 218 and may determine a plan based on the print material consumption of the image rendering device 106-1.

In an example, based on the received data, the server 102 may determine a first plan for the image rendering device 106-1. The first plan may enable the procurement of print material for the image rendering device 106-1 and may have an associated cost which may account for the subscription fee and any applicable discounts. For example, if the received data indicates that print material consumption of the image rendering device 106-1 is an example amount of weight or volume, such as 50 milliliters, for a month on an average, the subscription plan determination engine 216 may determine a plan which may provide the user with 50 milliliters of print material on a monthly basis for a monthly subscription fee that may be defined by the service provider for the plan.

The user is notified of the first plan by the notification engine 104. For the purpose, the notification engine 104 of the server 102 may transmit signals, which enable provision of a notification to indicate the first plan. In an example, the notification engine 104 of the server 102 may transmit the signals to the image rendering device 106-1. The image rendering device 106-1 may process the signals to display the notification on a display of the image rendering device 106-1.

In an example, the image rendering device 106-1 may process the signals to generate a notification and may thereafter transmit the notification (or signals indicative of the notification) to a user. For example, during installation of the image rendering device 106-1, the image rendering device 106-1 may prompt the user to provide contact information, such as email or mobile of the user and may store the same. Thus, in one example, notifications may be sent to users using stored contact information. For instance, the image rendering device 106-1 may retrieve the stored contact information and may transmit the notification to the user using the contact information. For example, the image rendering device 160-1 may enable transmission of an email to a stored email address or may enable transmission of a text-based message to a stored mobile phone number, etc.

In another example, the contact information of the user of the image rendering device 106-1 may be stored in the subscription database 112. The notification engine 104 may access the subscription database 112 to retrieve a subscription information of the image rendering device 106-1. The subscription information of an image rendering device, such as the image rendering device 106-1 may comprise the contact information, such as an email of the user or a mobile number of the user. Further, the notification engine 104 may transmit the notification to the contact identity of the user.

In yet another example, the notification engine 104 may transmit the signals to a service provider (providing procurement of print material) and the service provide may in turn notify the user, regarding the first plan, via stored contact information. For example, during installation of the image rendering device 106-1, a service provider of the image rendering device 106-1 may prompt the user to provide a contact information, such as an email or a mobile number and may store the same. To provide the notification, the service provider may transmit the notification using stored contact information. In other examples, notifications may be transmitted to users using an application on a computing device a pop-up message using a user interface of the image rendering device 106-1 or using an application on a mobile device of the user, and the like.

The user, may, thereafter, based on the notification, subscribe to the first plan. During the subscription period, or in other words, until the time the user is subscribed to the first plan, the first plan enables the procurement of the print material for the image rendering device 106-1. For instance, when the server 102 receives a low-on-print material message from the image rendering device 106-1, the server 102 may notify the service provider to dispatch or deliver the print material to the user of the image rendering device 106-1. As understood, the amount of print material dispatched or delivered is defined by the plan.

Further, in an example, the image rendering device 106-1 may already have a subscription to a plan, say, a second plan for print material procurement. For example, the second plan may be selected by user based on the user's estimation of the consumption of print material by the image rendering device 106-1. The details of the second plan that the image rendering device 106-1 is registered for, may be stored in the subscription database 112.

The server 102 may access the subscription database 112 to determine the details of the second plan. In an example, the server 102 may retrieve the cost associated with the second plan and may compare the same to the cost associated with the first plan. If the cost associated with the second plan is greater than the cost associated with the first plan, the notification engine 104 may enable the signals to cause the notification to indicate that the cost associated with the second plan is more than the cost associated with the first plan. Thus, in cases where a current plan is costlier than the plan determined by the server 102, the notification may indicate the cost difference to the user, for example, to highlight to the user that the latter may be more cost effective.

Further, in an example, other subscription details, such as username of a user using the image rendering device 106-1, contact information, such as mobile number, email of the user, may be collected from the user of the image rendering device 106-1, for example, at the time of registering the image rendering device 106-1 for the second plan. The subscription details may be stored in the subscription database 112. In an example, the notification engine 104 may retrieve the contact information of the user from the subscription database 112 and may use the same to provide the notification, for example, via an email or mobile number to the user associated with the image rendering device 106-1.

Figure 3:
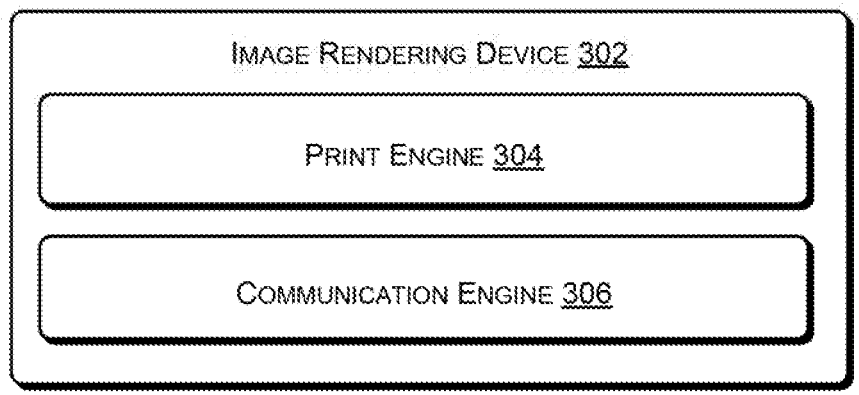
FIG. 3 illustrates an image rendering device, in accordance with an example implementation of the present subject matter.

FIG. 3 illustrates an image rendering device 302, in accordance with an example implementation of the present subject matter.

According to an implementation of the present subject matter, the image rendering device 302 includes a print engine 304. The print engine 304 may determine a volume of the print material consumed by the image rendering device 302 for a period of time. The print engine 304 may monitor the volume of the print material consumed by the image rendering device 302 over a week, a month, or a fortnight. Further, the print engine 304 may analyze a number of media printed by the image rendering device 302 over the period of time. As explained earlier, the number of media printed by the image rendering device 302 may indicate the print material consumption of the image rendering device 302.

Further, the image rendering device 302 may include a communication engine 306. The communication engine 306 of the image rendering device 302 may transmit data relating to, for example, the volume of print material used by the image rendering device 302 and the number of media printed by the image rendering device 302 to an SM server, such as the server 102, for example, periodically. In response to the transmission, the communication engine 306 may receive a notification from the SM server, where the notification may be indicative of a plan for the image rendering device 302 based on the transmitted data. Details relating to implementation and functionality of the image rendering device 302 are elaborated subsequently.

Figure 4:
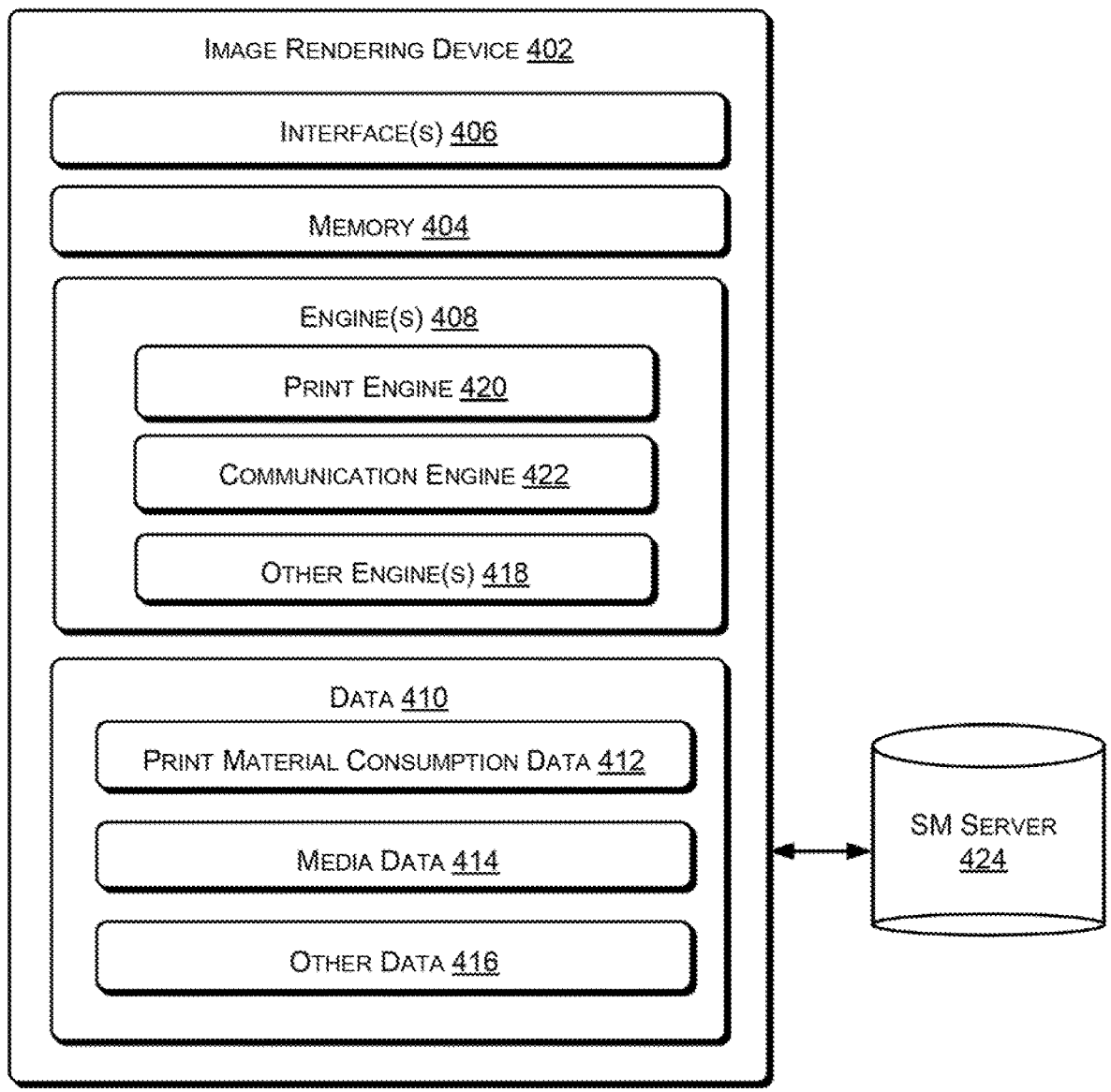
FIG. 4 illustrates an image rendering device, in accordance with another example implementation of the present subject matter.

FIG. 4 illustrates an image rendering device 402 in accordance with another example implementation of the present subject matter. The image rendering device 402, among other things, Includes and a memory 404, interface(s) 406, and engine(s) 408. The interface(s) 406 may enable the image rendering device 402 to couple to a network, such as the network 108. The memory 404, interfaces(s) 406, and engine(s) 408 may be similar in implementation to the memory 204, interface(s) 202, and engine(s) 206 as explained with reference to the FIG. 2.

The image rendering device 402 may comprise data 410 which may store data relating to the image rendering device 402, such as print material consumption data 412 and media data 414. The print material consumption data 412 may store the data relating to the volume of the print material consumed by the image rendering device 402 for a period of time and the media data 414 may store the data relating to number of media printed by the image rendering device 402 for a period of time. The data 410 may also comprise other data 416 to store data generated by other engine(s) 418 of the image rendering device 402.

In operation, a print engine 420, similar to the print engine 304, may determine a volume of the print material consumed by the image rendering device 402 for a period of time and may store the same in the print material consumption data 412. In an example, the print material of the image rendering device 402 may comprise multiple constituents, for example, print material, such as inks of several colors or different colorants. Accordingly, for determining the print material consumed by the image rendering device 402, the print engine 420 may estimate an amount of each of a colored print material used by the image rendering device 402 for the period of time. Further, in an example, the print engine 420 may also determine the number of media printed by the image rendering device 402 over the time and may store the same in the media data 414. A communication engine 422 may transmit the data stored in the print material consumption data 410 and media data 414 to a SM server 424, for example, similar to the above explained server 102.

In an example, the image rendering device 402 may determine the volume of print material used by the image rendering device 402 and the number of media printed by the image rendering device 402 for each print job performed by the image rendering device 402 and the same may be transmitted, by the communication engine 422, to the SM server 424. In another example, the print engine 420 may store the volume of print material used by the image rendering device 402 and the number of media printed by the image rendering device 402 periodically, for example, each day, week or month for the period of time and the communication engine 422 may make periodic transmission to the SM server 424.

The communication engine 422 may receive a notification from the SM server 424 indicating a plan for the image rendering device 402, where the plan is based on the transmitted data. In an example, the communication engine 422 may display the notification on a display of the image rendering device 402. Further, in an example, the communication engine 422 may transmit the notification to a contact identity associated with the image rendering device 402. In an example, the contact identity may be an email address, a mobile number of a user associated with the image rendering device 402, among other things. The communication engine 422 may transmit the notification to the email and the mobile number.

Figure 5:
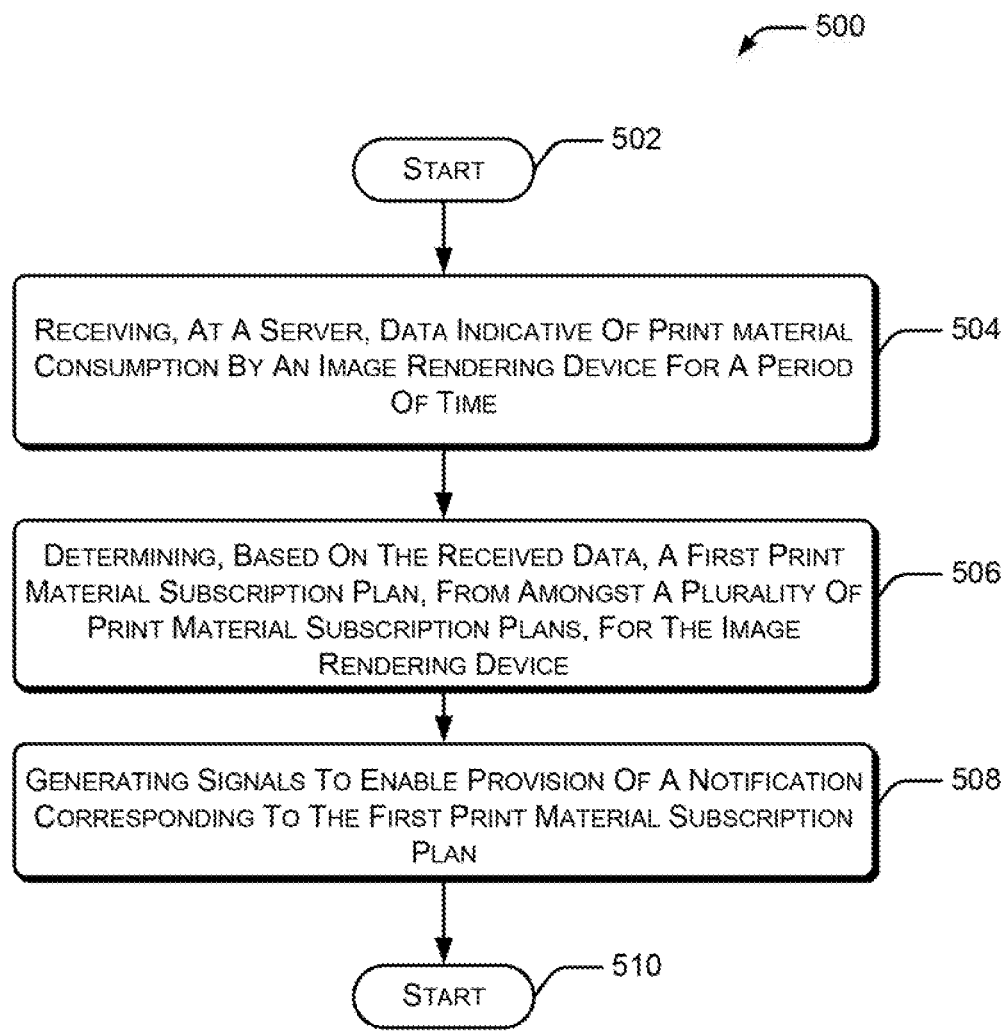
FIG. 5 illustrates a method for determining a print material subscription plan for an image rendering device, according to an example of the present subject matter.

FIG. 5 illustrates a method 500 for determining a plan in accordance with an example of the present subject matter. Although the method 500 may be implemented in a variety of servers, but for the ease of explanation, the present description of the example method 500 to determine the plan is provided in reference to the above-described server 102.

The order in which the method 500 is described is not intended to be construed as a limitation, and any number of the described method blocks may be combined in any order to implement the method 500, or an alternative method.

It may be understood that blocks of the method 500 may be performed by the server 102. The blocks of the method 500 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

The method 500 starts at block 502 and proceeds to block 504. At block 504, a server, such as the server 102, may receive a data indicative of the print material consumption by an image rendering device for a period of time. In an example, the image rendering device may be the image rendering device 106-1 and the data may be an amount of print material consumed by the image rendering device 106-1 for the period of time, number of media printed by the image rendering device 106-1 for the period of time, or mode of printing of the image rendering device 106-1 for the period of time. As explained earlier, the period of time may be a week, a month, a fortnight, in an example. Further, as explained earlier, the data may be sent at a periodicity or on a per-print-job basis, e.g., when the image rendering device 106-1 has executed the print job.

At block 506, the server 102 may determine, based on the received data, a first print material subscription plan, also referred herein as a first plan, from amongst plurality of plans. In an example, if the data received by the server 102 for 'n' months, indicates that the image rendering device 106-1 consumes, on an average, 10 ounces of print material in a month, the server 102 may determine a plan which provides 10 ounces of print material for the image rendering device 106-1 per month.

At block 508, the server 102, may generate signals to enable provision of notification corresponding to the determined first plan. In an example, the notification may be received by a service provider or a user of the image rendering device 106-1. Finally, the method stops at block 510.

Figure 6:
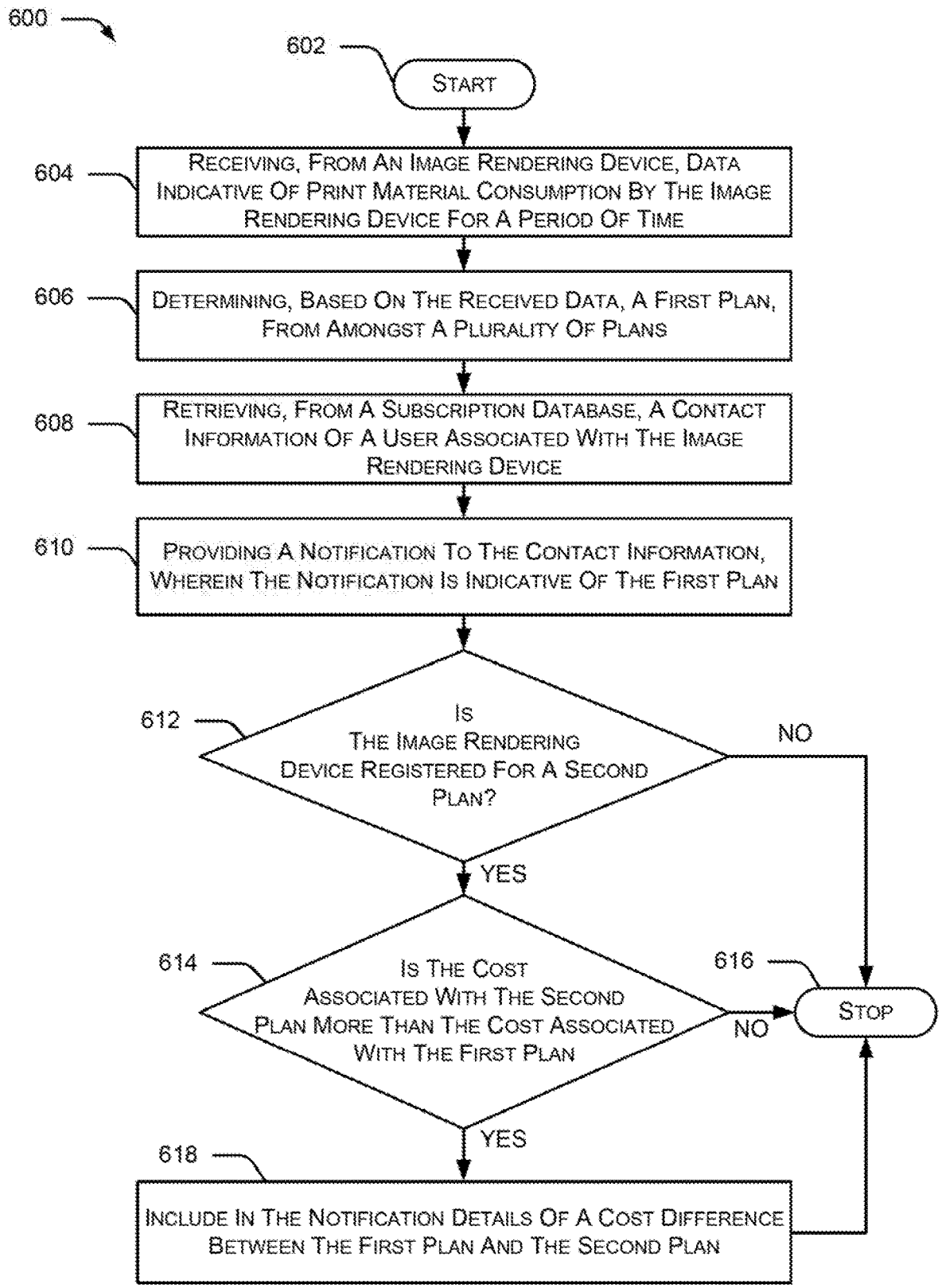
FIG. 6 illustrates a method for notifying a print material subscription plan for an image rendering device according to an example of the present subject matter.

FIG. 6 illustrates a method 600 for notifying, by a server, such as server 102, a plan for an image rendering device in accordance with an example of the present subject matter. Although the method 600 may be implemented in a variety of servers, but for the ease of explanation, the present description of the example method 600 to determine the plan is provided in reference to the above-described server 102.

The order in which the method 600 is described is not intended to be construed as a limitation, and any number of the described method blocks may be combined in any order to implement the method 600, or an alternative method.

It may be understood that blocks of the method 600 may be performed by the server 102. The blocks of the method 600 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

The method starts at block 602. Blocks 604 and 606 are similar to the blocks 504 and 506, respectively. As explained above in reference to FIG. 5, a first plan for an image rendering device, such an image rendering device 106-1, is determined at block 606 based on the data received at block 604. At block 608, a contact information of a user associated with the image rendering device is retrieved from a subscription database, such as subscription database 112. In an example, the subscription database may store contact information, such as emails, mobile numbers of the users associated with plurality of image rendering devices. At block 610, a notification is provided to the contact identity of a user associated with the image rendering device 106-1. The notification is indicative of the first plan determined for the image rendering device.

At block 612, it is determined, if the image rendering device is subscribed to a second plan. If the determination made at block 612 is affirmative, the method 600 proceeds to the decision block 614 while if the determination made at block 612 is not affirmative, the method stops at block 616.

At decision block 614, it is determined if the cost associated with the second subscription plan is more than the cost associated with the first plan. In an example, the cost of the first plan and the second plan may be retrieved from the subscription database and may be compared to make the determination. If the determination made at block 614 is affirmative, the method proceeds at block 618 where a cost difference between the first plan and the second plan is included in the notification. Thereafter, the method stops at block 616. However, if the determination made at block 614 is not affirmative, the method stops at block 616.

While the notification at block 618 highlights the cost difference between a current plan that the image rendering device is subscribed to, e.g., the second plan and a plan identified by the server based on print material consumption monitored by the server for a period of time, e.g., the first plan, the notification at block 610 may comprise the cost associated with the first plan alone.

Providing the notification comprising the cost associated with the first plan identified by the server based on print material consumption monitored by the server for a period of time may also make the user informed regarding a plan that may be better suited for the image rendering device. Considering an example where the image rendering device 106-1 has been subscribed to a second plan which ensures 7 milliliters of print material per month for an associated cost or subscription fees of 3 dollars. However, based on the received data, it is indicated that the image rendering device 106-1 consumes 12 milliliters of print material per month. In such cases, the user may have to additionally purchase 5 milliliters of print material which may incur additional cost to the user, say 2 dollars. Thus, the total cost incurred by the user of the image rendering device 106-1 is 5 dollars (3 dollars+2 dollars), in this example.

However, if it is determined that the first plan ensures procurement of 12 milliliters of print material, monthly, for an associated cost of 4 dollars, the notification may provide that the 12 milliliters of print material may be procured by the first plan at a cost of 4 dollars which is less than the cost he is currently incurring, e.g., 5 dollars.

Figure 7:
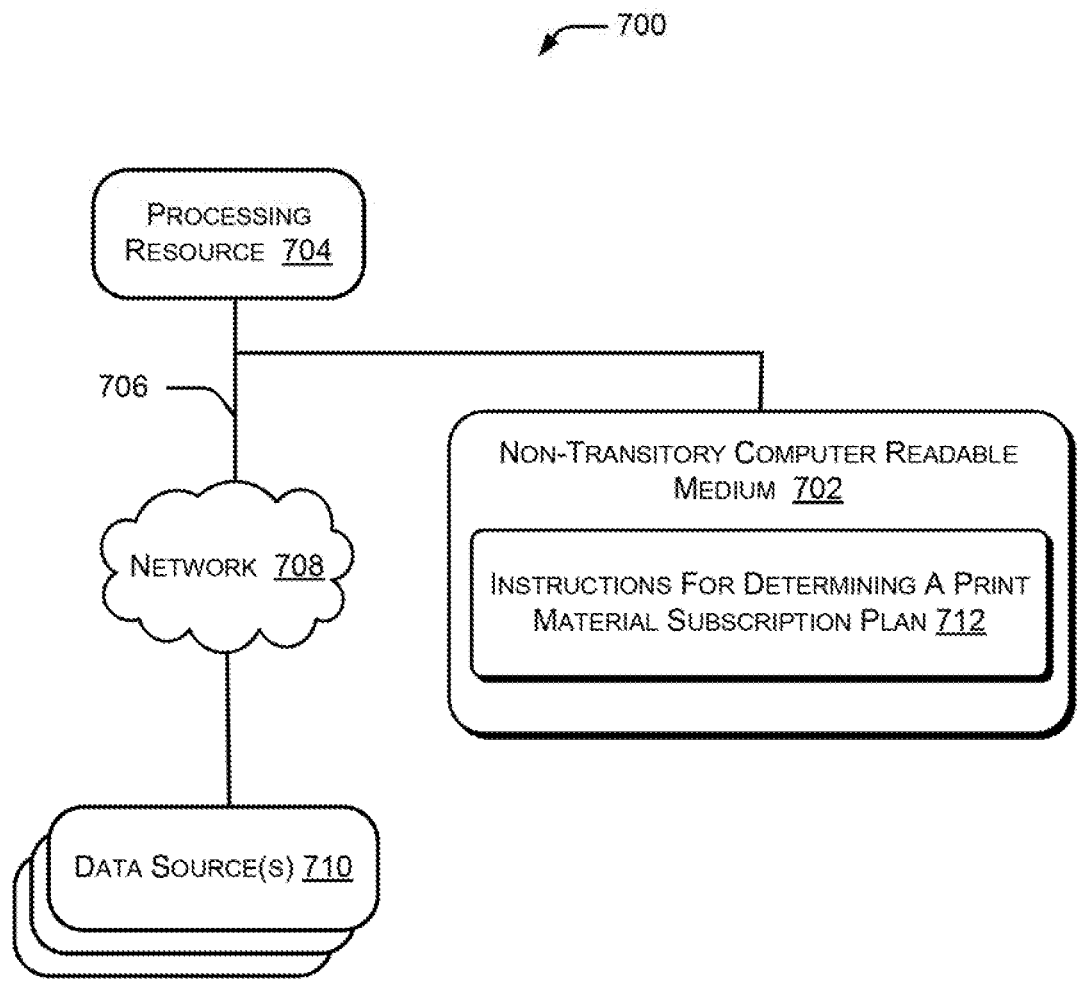
FIG. 7 illustrates a print environment for determining a print material subscription plan for an image rendering device, according to an example implementation of the present subject matter.

FIG. 7 illustrates a print environment implementing a non-transitory computer-readable medium for determining a plan for an image rendering device, according to an example. In an example, the print environment 700 may comprise a server, such as server 102. The print environment 700 includes a processing resource 702 communicatively coupled to the non-transitory computer-readable medium 704 through a communication link 706. In an example, the processing resource 702 may be a processor of the server 102 that fetches and executes computer-readable instructions from the non-transitory computer-readable medium 704.

The non-transitory computer-readable medium 704 can be, for example, an internal memory device or an external memory device. In an example, the communication link 706 may be a direct communication link, such as any memory read/write interface. In another example, the communication link 706 may be an indirect communication link, such as a network interface. In such a case, the processing resource 702 can access the non-transitory computer-readable medium 704 through a network 708. The network 708 may be a single network or a combination of multiple networks and may use a variety of different communication protocols.

The processing resource 702 and the non-transitory computer-readable medium 704 may also be communicatively coupled to data sources 710. The data source(s) 710 may also be used to store data, such as print material consumption data of image rendering devices. Further the data source(s) 710 may be a database, such as the subscription database 112 which may store contact information of users. In an example, the non-transitory computer-readable medium 704 comprises executable instructions 712 for determining a plan based on print material consumption data of the image rendering devices. For example, the non-transitory computer-readable medium 704 may comprise instructions executable to implement the previously described notification engine 104.

In an example, the instructions 712 may be executable by the processing resource 702 to determine, based on a received data from the image rendering device 106-1, a number of media printed by an image rendering device, such as image rendering device 106-1, for a period of time. The processing resource 702 may determine, based on the received data, a first plan for the image rendering device. For example, if the received data indicates that the image rendering device prints 20 media on an average for a period of time, say a month, the processing resource 702 may determine a plan which may provide print material to the image rendering device so that the image rendering device may print 20 media, monthly. Further, according to an example, the instructions 712 may be executable by the processing resource 702 to generate signals to enable provision of notification corresponding to the first plan. In an example, the signals may be transmitted to the image rendering device which would than process the signal to provide the notification regarding the first plan and subsequently, a user of the image rendering device may subscribe to the first plan.

In an example, the received data may also comprise low-on print material messages generated by the image rendering device for the period of time. The instructions 712 may be executable by the processing resource 702 to determine the average time between the two consecutive low-on-print material messages based on which the print material consumption of the image rendering device may be determined. In such cases, the processing resource 702 may determine the first plan based on the number of media printed by the image rendering device and the low-on-print material messages.

In another example, the instructions 712 may be executable by the processing resource 702 to retrieve a contact information of a user associated with the image rendering device. In an example, the contact information may be stored in data sources 710 and the processing resource 702 may access the data sources to retrieve the contact information of the user associated with the image rendering device. In an example, the contact information may be an email of the user, a mobile number of the user. In an example, the instructions 712 may be executable by the processing resource 702 to send the notification to the contact identity of the user.

Further, in an example, the image rendering device may already have a subscription to a plan, say, a second plan for print material procurement. The details of the subscription of plans of the image rendering devices may be stored in a subscription database, such as the subscription database 112. In an example, the subscription database may be a part of the data sources 710. The processing resource 702 may access the subscription database and may determine that the image rendering device is already subscribed to the second subscription plan. Thereafter, in an example, processing resource 602 may access the subscription database to determine the cost associated with the first plan and the second plan. The processing resource 702 may compare the cost associated with the first plan and the second plan and may generate the signals to enable provision of notification to indicate a difference between the cost associated with the second plan and the cost associated with the first plan when the cost of the second plan is greater than the cost of the first plan. In an example and as explained earlier, the signals may be transmitted to the image rendering device and which may then process the signals to generate the notification. In another example, the notification may be sent to a contact identity of the user, as explained in the above para.

Thus, the methods and devices of the present subject matter provide techniques to determine a print material subscription plan for an image rendering device. Although examples of determining the print material subscription plan as described, have been described in a language, specific to structural features and/or methods, it is to be understood that the appended claims are not necessarily limited to the specific features or methods described. Rather, the specific features and methods are disclosed as example for determining the print material subscription plan.

The invention claimed is:
1. A method comprising:
receiving, at a server, data indicative of print material consumption by an image rendering device for a period of time and an average time between two consecutive low-on-print material messages generated by the image rendering device;
determining, based on the received data and the average time between two consecutive low-on-print material messages generated by the image rendering device, a first print material subscription plan, from amongst a plurality of print material subscription plans, for the image rendering device; and
generating signals to enable provision of a notification corresponding to the first print material subscription plan.
2. The method as claimed in claim 1, wherein the data indicative of print material consumption by the image rendering device comprises one of: a number of media printed by the image rendering device; a mode of printing of the image rendering device; and a type of content printed by the image rendering device.
3. The method as claimed in claim 1 further comprises:
accessing, by the server, a subscription database, to determine, if the image rendering device is registered for a second print material subscription plan from amongst the plurality of print material subscription plans.
4. The method as claimed in claim 3, wherein when the image rendering device is registered for the second print material subscription plan, the method further comprising:
retrieving, from the subscription database, a cost associated with the first print material subscription plan and the second print material subscription plan; and
comparing the cost associated with the second print material subscription plan with a cost associated with the first print material subscription plan,
wherein the signals are to enable the notification to indicate a difference between the cost associated with the second print material subscription plan and the cost associated with the first print material subscription plan when the cost associated with the second print material subscription plan is more than the cost associated with the first print material subscription plan.
5. The method as claimed in claim 3, wherein when the image rendering device is registered for the second print material subscription plan, the method further comprising:
retrieving subscription information pertaining to the second print material subscription plan, wherein the subscription information comprises a contact information of a user of the image rendering device.
6. The method as claimed in claim 3, wherein receiving the data indicative of print material consumption by the image rendering device comprises receiving a low-on-print material message.
7. An image rendering device comprising:
a print engine to:
determine a number of media printed by the image rendering device for the period of time and an average time between two consecutive low-on-print material messages generated by the image rendering device;
a communication engine to:
transmit data relating to the number of media printed by the image rendering device and the average time between two consecutive low-on-print material messages generated by the image rendering device to a subscription management (SM) server; and
receive, from the SM server, a notification indicative of a print material subscription plan for the image rendering device, the print material subscription plan being based on the transmitted data.

8. The image rendering device as claimed in claim 7, wherein the communication engine is to display the notification on a display of the image rendering device.

9. The image rendering device as claimed in claim 7, wherein the communication engine is to further transmit the notification on a contact identity of a user associated with the image rendering device.

10. The image rendering device as claimed in claim 7, wherein to determine the volume of print material consumed by the image rendering device, the print engine is to estimate an amount of each of colored inks used by the image rendering device for the period of time.

11. A non-transitory computer-readable medium comprising instructions executable by a processing resource to:
   determine, based on data received from an image rendering device, a number of media printed by the image rendering device for a period of time and an average time between two consecutive low-on-print material messages generated by the image rendering device;
   ascertain a first print material subscription plan for the image rendering device based on the number of media printed and the average time between two consecutive low-on-print material messages generated by the image rendering device; and
   generate signals to enable provision of a notification corresponding to the first print material subscription plan.

12. The non-transitory computer-readable medium as claimed in claim 11, further comprising instructions executable by the processing resource to:
   retrieve a contact information associated with a user of the image rendering device; and
   transmit the notification to the user using the contact information.

13. The non-transitory computer-readable medium as claimed in claim 11, further comprising instructions executable by the processing resource to:
   access a subscription database to retrieve subscription information relating to the image rendering device; and
   determine, based on the subscription information, if the image rendering device is registered for a second print material subscription plan.

14. The non-transitory computer-readable medium as claimed in claim 13, wherein the non-transitory computer-readable medium comprising instructions executable by the processing resource to:
   retrieve, from the subscription database, a cost associated with the first print material subscription plan and the second print material subscription plan;
   compare a cost associated with the first print material subscription plan to a cost associated with the second print material subscription plan, when the image rendering device is registered for the second print material subscription plan; and
   generate the signals to enable provision of notification to indicate a difference between the cost associated with the second print material subscription plan and the cost associated with the first print material subscription plan when the cost of the second print material subscription plan is greater than the cost of the first print material subscription plan.

* * * * *